US011752606B1

(12) United States Patent
Young

(10) Patent No.: US 11,752,606 B1
(45) Date of Patent: Sep. 12, 2023

(54) GRASPING AND POSITIONING TOOL AND METHODS OF USING IT

(71) Applicant: Hunter Young, Troutville, VA (US)

(72) Inventor: Hunter Young, Troutville, VA (US)

(73) Assignee: CQ Innovations, Inc., Troutville, VA (US)

( * ) Notice: Subject to any disclaimer, the term of this patent is extended or adjusted under 35 U.S.C. 154(b) by 524 days.

(21) Appl. No.: 16/517,454

(22) Filed: Jul. 19, 2019

Related U.S. Application Data

(60) Provisional application No. 62/701,450, filed on Jul. 20, 2018.

(51) Int. Cl.
| | |
|---|---|
| *B25B 27/14* | (2006.01) |
| *B25B 13/06* | (2006.01) |
| *B25B 23/00* | (2006.01) |
| *F16B 37/04* | (2006.01) |
| *B25B 15/00* | (2006.01) |

(52) U.S. Cl.
CPC .............. *B25B 27/14* (2013.01); *B25B 13/06* (2013.01); *B25B 15/00* (2013.01); *B25B 23/0035* (2013.01); *F16B 37/046* (2013.01)

(58) Field of Classification Search
CPC ..... B25B 27/14; B25B 27/143; B25B 27/146; B25B 27/00–0092; B25B 13/06; B25B 15/00; B25B 23/0035; B25B 3/00; B25B 5/061; B25B 5/065; F16B 37/046; F16B 37/041–047; B25C 3/00; B25C 3/006; A61B 17/8875–8894; B25J 15/0047; B66C 1/54

USPC ........ 29/278, 271, 255, 244, 243.5, 243.53, 29/243.56, 238, 280, 263; 269/22, 47, 269/48.1, 52; 81/44, 13; 606/104; 294/195, 93, 94
See application file for complete search history.

(56) References Cited

U.S. PATENT DOCUMENTS

| | | | | |
|---|---|---|---|---|
| 1,421,152 | A * | 6/1922 | Berman | B25B 27/00 29/278 |
| 2,532,972 | A * | 12/1950 | Vertin | B25B 23/105 81/443 |
| 2,556,395 | A * | 6/1951 | MacLean | B25B 23/106 81/443 |
| 6,345,426 | B1 * | 2/2002 | Collier | B25B 5/147 29/263 |
| 10,220,498 | B2 * | 3/2019 | Shipman | F16L 33/30 |
| 2005/0033307 | A1 * | 2/2005 | Cook | A61B 17/8888 606/104 |
| 2006/0144194 | A1 * | 7/2006 | Rillera | B25B 9/02 81/13 |
| 2007/0222245 | A1 * | 9/2007 | Maffeis | B25J 15/12 294/93 |

* cited by examiner

*Primary Examiner* — Lee D Wilson
*Assistant Examiner* — Michael A Gump
(74) *Attorney, Agent, or Firm* — Rhodes IP PLC; Christopher R Rhodes

(57) ABSTRACT

A grasping and positioning tool is provided that can be used to position a channel insert within channel framing. The tool includes an expandable member that can frictionally engage the channel insert in one position of the tool and release the channel insert in another position of the tool. The tool can be used to permit single handed placement of a channel nut or similar insert into channel framing.

7 Claims, 10 Drawing Sheets

GRASPING AND POSITIONING TOOL AND METHODS OF USING IT

PRIORITY APPLICATION

This application is related to, and claims priority to and the benefit of, U.S. Application No. 62/701,450 filed on Jul. 20, 2018, the entire disclosure of which is hereby incorporated herein by reference for all purposes.

TECHNOLOGICAL FIELD

Certain configurations described herein are directed to a grasping and positioning tool. More particularly, certain configurations are described herein that are designed to grasp and position an insert within a channel using only the tool.

BACKGROUND

Positioning and/or placement of a fastener in building industry applications often involves the use of two hands—one hand to hold the fastener and the other had to place and/or attach the fastener. Placement of the fastener can be particularly difficult where the fastener is designed to be inserted into a channel through an end of the channel.

SUMMARY

Certain configurations are described herein of a grasping and positioning tool that can be used to securely grasp a insert such as, for example, a channel nut insert, position the insert and release the insert at a desired site along the channel. In some examples, the tool may comprise at least one feature which can grasp the insert through a friction fit in a first position of the tool and release the insert in a second position of the tool. For example, an outer diameter of the feature may increase in the first position of the tool to promote frictional engagement between the feature and the insert, and the feature can return to a resting or normal diameter in a second position of the tool to release the insert. If desired, an opposite configuration may be produced where a resting or normal diameter for the feature is present in a first position of the tool and an outer diameter of the feature may increase in the second position of the tool to promote frictional engagement between the feature and the insert. Several different configurations of many possible configurations of the tool are described in more detail below.

In a first aspect, a grasping and positioning tool comprises a handle, a moveable member, a first longitudinal member, a second longitudinal member and an expandable member. In some instances, the first longitudinal member comprises a first end and a second end opposite the first end. The first longitudinal member can be coupled to the handle at the first end of the first longitudinal member and is configured to receive the moveable member to permit longitudinal movement of the moveable member along a longitudinal dimension of the first longitudinal member. The second longitudinal member comprises a first end and a second end. The second longitudinal member can be inserted into the first longitudinal member. The second longitudinal member can be coupled to the moveable member at the first end of the second longitudinal member so that adjustment of a position of the moveable member moves the second longitudinal member longitudinally within the first longitudinal member. The expandable member can be coupled to the second end of the second longitudinal member and can be configured to increase its outer diameter as the moveable member is moved toward the handle coupled to the first longitudinal member.

In certain configurations, the tool further comprises a spring positioned within the first longitudinal member and positioned between the first end of the first longitudinal member and the first end of the second longitudinal member. The spring can be configured to bias the second longitudinal member away from the handle in a non-compressed state of the spring. In some examples, the moveable member is coupled to the second longitudinal member through an internal fastener. In other examples, the tool further comprises an external fastener positioned at the second end of the first longitudinal member, wherein the external fastener comprises an inner diameter smaller than an inner diameter of the first longitudinal member. In certain examples, the second longitudinal member comprises threads, pins or other means or features at the second end to permit coupling to the expandable member. In some examples, the tool further comprises an additional external fastener coupled to the threads at the second end of the second longitudinal member, wherein the additional external fastener is configured to retain the expandable member between the external fastener and the additional external fastener. In some configurations, the external fastener and the additional external fastener are sized and arranged together to compress the expandable member and increase its outer diameter when the moveable member is moved toward the handle.

In some examples, the handle is configured to receive a socket or driver or other tools.

In certain instances, the moveable member is configured as a T-shaped handle or a L-shaped handle or may be configured as a handle with other suitable shapes. In some examples, the moveable member is configured to lock into a position to keep the expandable member in the compressed position to retain its increased outer diameter without applying continued force to the moveable member.

In some examples, the second longitudinal member is coupled to a compressible member at the first end of the second longitudinal member, wherein the compressible member is positioned within the first longitudinal member and engages an internal surface of the handle as the moveable member is moved toward the handle.

In some configurations, the expandable member is sized and arranged to insert into an aperture of an insert when the moveable member is in a first position and frictionally engages the insert when the moveable member is in a second position, wherein the second position of the moveable member is spatially closer to the handle than the first position of the moveable member, and wherein frictional engagement of the insert by the expandable member in the second position of the moveable member permits positioning of the insert using the grasping and positioning tool.

In some instances, the expandable member comprises an elastic material with a high coefficient of friction.

In certain examples, each of the handle, the first longitudinal member, the second longitudinal member, the moveable member and the expandable member comprises non-electrically conductive materials. In certain embodiments, a position of the handle is adjustable along the first longitudinal member.

In another aspect, a grasping and positioning tool comprises a first handle member comprising a first end and a second end, a second handle member comprising a first end and a second end, a first longitudinal member comprising a first end and a second end opposite the first end, the first longitudinal member coupled to the first end of the first handle member at an outer surface of the first longitudinal member, a second longitudinal member comprising a first end and a second end, the second longitudinal member inserted into the first longitudinal member, the second longitudinal member coupled to the first end of the second handle member at the first end of the second longitudinal member so that movement of the second handle member moves the second longitudinal member longitudinally within the first longitudinal member, and an expandable member coupled to the second end of the second longitudinal member, the expandable member configured to increase its outer diameter as a position of the second handle member is adjusted to move the first end of the second longitudinal member toward the first end of the first longitudinal member.

In certain examples, the tool further comprises a spring between the first handle member and the second handle member, the spring configured to bias the second end of the first handle member away from the second end of the second handle member in a non-compressed state of the spring.

In other examples, the tool comprises a spring positioned within the first longitudinal member and positioned between the first end of the first longitudinal member and the first end of the second longitudinal member, the spring configured to bias the second longitudinal member away from the first end of the first longitudinal member in a non-compressed state of the spring.

In some examples, the first end of the second handle member is coupled to the second longitudinal member through an internal fastener. In other examples, the tool further comprises an external fastener positioned at the second end of the first longitudinal member, wherein the external fastener comprises an inner diameter smaller than an inner diameter of the first longitudinal member. In some examples, the second longitudinal member comprises threads at the second end, comprises pins at the second end or comprises other features or means to couple to the expandable member.

In certain examples, the tool further comprises an additional external fastener coupled to the threads at the second end of the second longitudinal member, wherein the additional external fastener is configured to retain the expandable member between the external fastener and the additional external fastener. In some examples, the external fastener and the additional external fastener are sized and arranged together to compress the expandable member and increase its outer diameter when the second end of the first handle member and the second end of the second handle member are moved toward each other. In some embodiments, the first longitudinal member is configured to receive a socket or driver. In certain examples, the second handle member is configured to lock into a position to keep the expandable member in the compressed position to retain its increased outer diameter without applying continued force to the second handle member. In some examples, the second longitudinal member is coupled to a compressible member at the first end of the second longitudinal member, wherein the compressible member is positioned within the first longitudinal member and engages an internal surface of the first end of the first longitudinal member as the second end of the first handle member is moved toward the second end of the second handle member.

In some embodiments, the expandable member is sized and arranged to insert into an aperture of an insert when the second handle member is in a first position and frictionally engages the insert when the second end of the second handle member is moved toward the second end of the first handle member in a second position of the second handle member, wherein the second position of the second handle member brings the second end of the first handle member and the second end of the second handle member spatially closer to each other, and wherein frictional engagement of the insert by the expandable member in the second position of the second handle member permits positioning of the insert using the grasping and positioning tool.

In other examples, the expandable member comprises an elastic material with a high coefficient of friction. In some examples, each of the first handle member, the second handle member, the first longitudinal member, the second longitudinal member and the expandable member comprise non-electrically conductive materials. In other examples, a length of each of the first handle member and the second handle member are adjustable.

In another aspect, a kit comprising a tool as described herein and two or more expandable members of different size is disclosed. In other aspects, a method of using the tools described herein to position an insert within a channel is described.

Additional aspects, configurations and features are described in more detail below.

BRIEF DESCRIPTION OF THE SEVERAL VIEWS OF THE FIGURES

Certain illustrations are described below with reference to the accompanying figures in which.

It will be recognized by the person of ordinary skill in the art, given the benefit of this disclosure, that the components of the figures are not necessarily drawn to scale. The size of any one component relative to another component may vary, and different lengths, widths and shapes are possible for the different features of the illustrations described herein.

DETAILED DESCRIPTION

Certain configurations are described in more detail with reference to a tool that can be used with inserts or articles that can be positioned within channel structures such as those used in framing applications, e.g., metal framing channels, fiberglass framing channels, telestrut tubing and other framing members that may comprise a C-shape, rectangular shape or other channel shapes. It will be recognized by the person skilled in the art, given the benefit of this disclosure, that additional configurations may also be produced using one or more of the features described herein. Unless otherwise specified in the description below, the components of the tool are not necessarily drawn to scale and any dimensions are intended only to be illustrative and non-limiting.

Various illustrations are described with reference to the term "insert." The exact configuration of the insert used can depend on the shape and configuration of the tool. In some examples, the tool can be used to grasp and place a nut, a fitting, an insert, or other articles that can be inserted into an internal channel or another device. In some embodiments, the insert may comprise a spring or other structural features. The exact shape and size of the insert can be selected based on the shape and size of the channel member which the insert is intended to be inserted. Illustrative shapes are rectangular, round, triangular, square or other geometric shapes. The insert typically comprises one or more apertures or openings which can be engaged by the tool to grasp and move the insert to a desired site within the channel. Many different types of inserts and channels are sold commercially by different manufacturers including, for example, Atkore International under the brand name UNISTRUT®. In some examples, the insert may comprise an opening or aperture configured to receive a bolt, screw or other fastener. The bolt, screw or other insert can be inserted into the insert that has been positioned using the tool described herein and tightened to retain the insert at a desired site along a channel. The insert can be used, for example, to position and retain electrical wiring, plumbing, HVAC articles or other electrical or building articles.

Figure 1A:
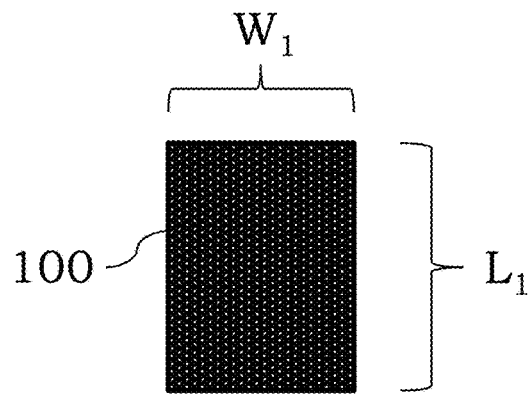
FIGS. 1A, 1B, 1C and 1D are illustrations showing an expandable member in different states, in accordance with some examples.
Figure 1B:
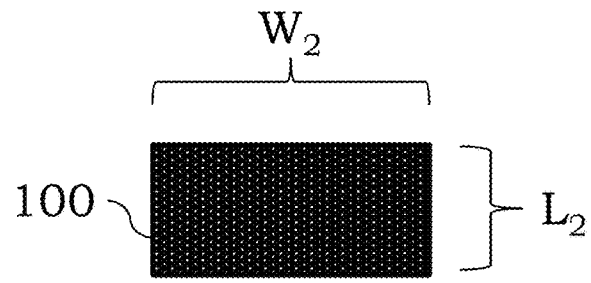

In certain examples, the tools described herein may comprise an expandable member that can be configured to frictionally engage some portion or area of an insert to permit grasping and/or placement of the insert with a channel structure. A generalized illustration of an expandable member is shown in FIGS. 1A and 1B. Referring to FIG. 1A, the expandable member 100 can compress upon application of a suitable force. The illustration of FIG. 1A shows the expandable member 100 in a relaxed or resting state such that the member has a length of $L_1$ and a width $W_1$. Referring to FIG. 1B, as the expandable member 100 is compressed upon application of a force to reduce the length $L_1$ to a length $L_2$, the width or diameter of the expandable member 100 increases to $W_2$. This increase permits the expandable member 100 to engage a surface of a nut or other insert and retain that insert as long as the expandable member comprises a diameter greater than di. By continued application of force to the expandable member 100, the grasped insert can be moved into position by moving a tool handle that is coupled to the expandable member 100. Various illustrations of such tools are discussed in more detail below. In one use of the expandable member 100, the expandable member 100 can be inserted into an aperture or opening of an insert. A force can then be provided to the expandable member 100 to cause the expandable member to expand and frictionally engage an internal surface of the insert through one or more surfaces of the expanded expandable member 100. Continued application of the force permits movement of the engaged insert to a desired site by movement of the tool coupled to the expandable member 100. Once the insert is positioned at a desired site, application of the force on the expandable member 100 can be discontinued to permit the expandable member 100 to return to its diameter di and release the insert. The tool can then be removed and used to place another insert. A screw, bolt or other device may also be inserted into the positioned insert to retain the insert and any coupled devices at a particular channel site.

Figure 1C:
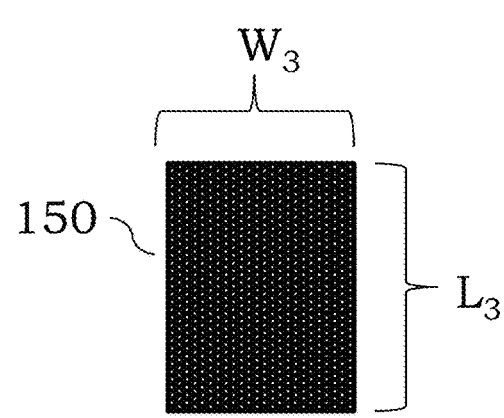
Figure 1D:
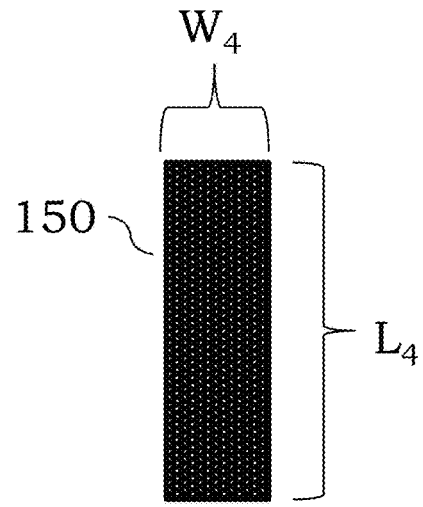

In some examples, it may be desirable to configure the expandable member of the tool so that it is present in an expanded state when the user is not actuating or using the tool. By configuring the expanded state to be present when the tool is not actuated, continued application of force to the expandable member is not necessary to grasp and place the insert. A simplified illustration is shown in FIGS. 1C and 1D. Referring to FIG. 1C, an expandable member 150 is shown that comprises a length $L_3$ and a width $W_3$. In this relaxed state of the tool, the diameter $W_3$ is generally too large to fit into an aperture or opening of the insert. Application of a force, e.g., a stretching force, can act to decrease the diameter of the member 150 to a lesser diameter $W_4$ as shown in FIG. 1D. This decrease in diameter lengthens the expandable member 150 to a length $L_4$ and permits insertion of the member 150 into the aperture or opening of the insert. Once inserted, the force can be released to permit the member 150 to return to its initial position with a diameter $W_3$. The grasped insert can then be positioned using the tool without the need to continuously apply force to the expandable member to retain the insert with the tool. Once the insert is positioned at a suitable site, force may then be applied to the expandable member 150 to cause the diameter to change from $W_3$ to $W_4$ and permit the tool to release the insert. The tool can then be removed from the insert and used to position another insert at a desired site. A screw, bolt or other device may also be inserted into the positioned insert to retain the insert and any coupled devices at the channel site.

In some examples, the expandable member may be part of a tool that can be used to frictionally engage an insert. Referring to FIG. 2, one illustration of a tool 200 is shown. The tool 200 comprises a fixed handle or end 210, a moveable member 220, a first longitudinal member 230, a second longitudinal member 240 and an expandable member 250. The first longitudinal member 230 is coupled to the handle 210 at a first end. The first longitudinal member 230 is sized and arranged to permit insertion of the second longitudinal member 240 into the first longitudinal member 230 and permit longitudinal movement of the second longitudinal member 240 within the first longitudinal member 230. While not shown, a longitudinal slot is typically present in the first longitudinal member 230 between the moveable member 220 and handle 210 to permit the moveable member 220 to be moved toward the handle 210. The second longitudinal member 240 is coupled to the moveable member 220 at a first end so that movement of the moveable member 220 toward the handle or end 210 acts to pull the second longitudinal member 240 toward the handle or end 210. The expandable member 250 is coupled to the second longitudinal member 240 at a second end of the second longitudinal member 240. As the moveable member 220 is moved toward the handle or end 210, the second longitudinal member 240 moves and pulls on the expandable member 250, which acts to increase its outer diameter. The first longitudinal member 230 may comprise a flare, fastener or other means 260 at an end. The second longitudinal member 240 may also couple to a fastener, disk or other means 270 to position the expandable member 250 between the fasteners 260, 270. This positioning of the fasteners 260, 270 around the expandable member 250 causes the expandable member 250 to "squish" or become flattened when the moveable member 220 moves toward the end or handle 210. An overall increase in the outer diameter of the expandable member 250 can act to permit frictional engagement between the expandable member 250 and an insert. The diameters and/or shapes of the fasteners 260, 270 can be selected to capture the expandable member 250 to prevent it from being removed from the tool 200 during its operation. In some examples, the longitudinal members 230 and 240 may comprise flared ends that may function in place of the fasteners 260, 270 and permit retention of the expandable member 250. In such instances, the expandable member 250 can be configured as a sleeve which slides over the end 270 and is retained along the shaft of the second longitudinal member 240. The flared end 260 acts to compress the expandable member 250 when the moveable member 220 is moved toward the handle or end 210. While not shown, the first longitudinal member 230 may comprise stops or raised areas to limit the movement of the moveable member 220. For example, raised projections, bosses, etc. may be present to prevent the moveable member 220 from moving too far either way along the longitudinal direction of the first longitudinal member 230.

Figure 2A:
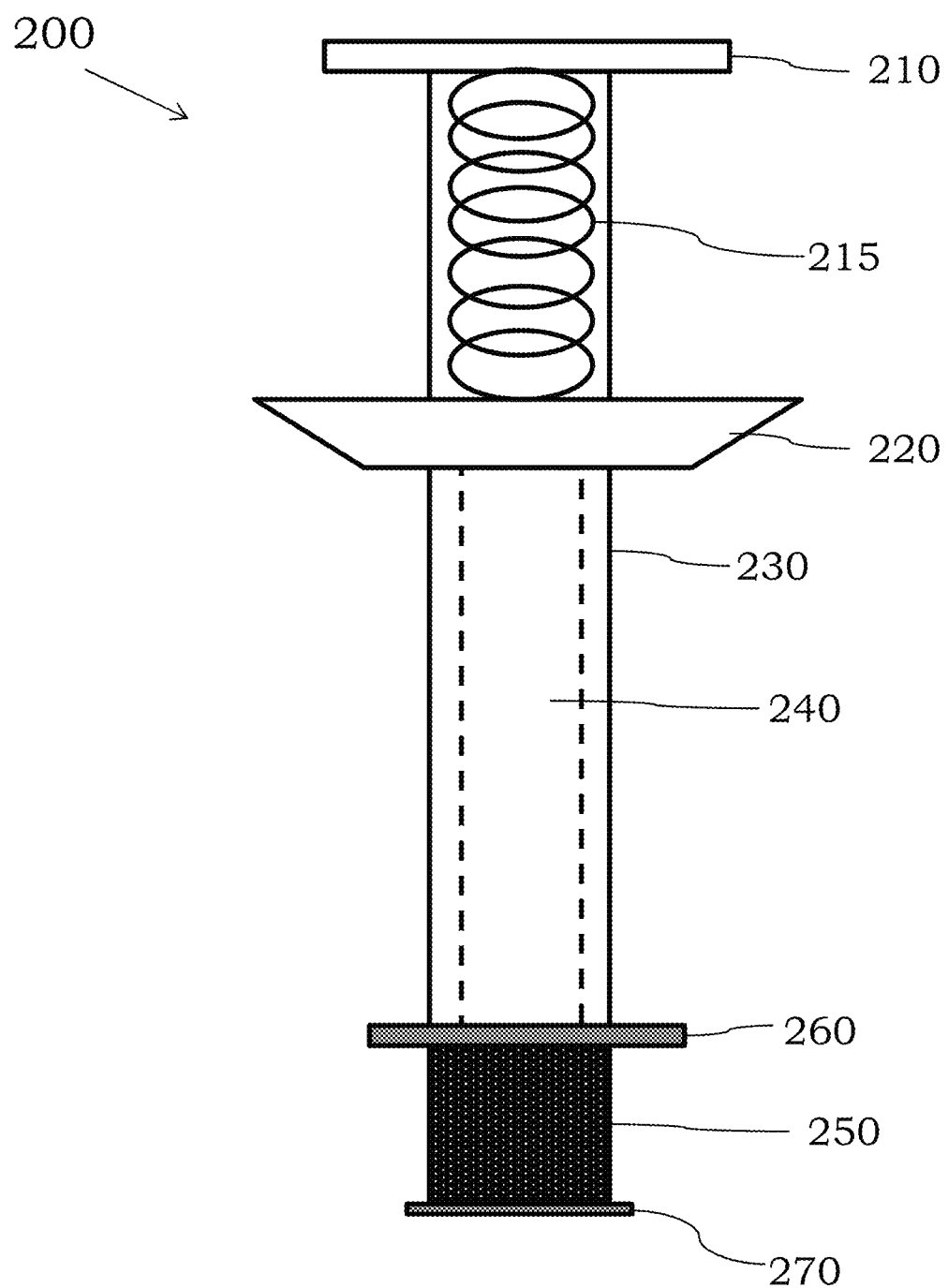
FIG. 2A is one illustration of a grasping tool, in accordance with certain examples.

In one configuration and as shown in FIG. 2A, a spring 215 or other compression means, e.g., a hydraulic cylinder, pneumatic cylinder, compressible rubber material, etc. can be positioned within the first longitudinal member 230 and positioned between the first end of the first longitudinal member 230 and the first end of the second longitudinal member 240. The spring 215 can be configured to bias the second longitudinal member 240 away from the handle 210 in a non-compressed state of the spring 215. During movement of the moveable member 220 toward the handle 210, the spring 215 or other compression means can be compressed and provide a resistive force. When the moveable member 220 is released, the spring 215 or other compression means can act to bias the moveable member 220 away from the handle 210.

In some examples, the moveable member 220 can be coupled to the second longitudinal member 240 through an internal fastener, threads, bayonet features, pins, adhesive or other means. Notwithstanding that many different means can be used to couple the members 220, 240 to each other, the members 220, 240 generally move together in the same direction. Where the tool comprises fasteners 260, 270 at the ends of the tool, the first longitudinal member 230, second longitudinal member 240 or both may comprise threads, pins, bayonets, holes, apertures, etc. that are configured to couple the fasteners 260, 270 to the longitudinal members 230, 240, respectively. Alternatively, the fasteners 260, 270 can be permanently coupled using rivets, adhesives, welds, brazing or the like.

While not shown, the handle or end 210, the moveable member 220 or both can be configured to receive an attachment such as a socket, driver, screwdriver bit, drill bit, wire stripper or other features. The moveable member 220 can be configured as a T-shaped handle as shown in FIG. 2A or may have other shapes as noted in more detail below.

In some examples, the tool 200 may comprise a locking feature on the first longitudinal member 230 or other component of the tool 200 to retain the moveable member 220 in a position to keep the expandable member 250 in the compressed position to retain its increased outer diameter without applying continued force to the moveable member 220. Such features may be a pin which protrudes into a hole and prevent movement of the moveable member 220 back to an initial position or may be a feature which engages a slot of the member 230 to prevent the moveable member 220 from moving. In some examples, the expandable member 250 comprises an elastic material with a high coefficient of friction. In certain configurations, each of the handle 210, the first longitudinal member 230, the second longitudinal member 240, the moveable member 220 and the expandable member 250 comprises non-electrically conductive materials. If desired, a position of the handle 210 can be adjustable along the first longitudinal member 230.

Figure 2B:
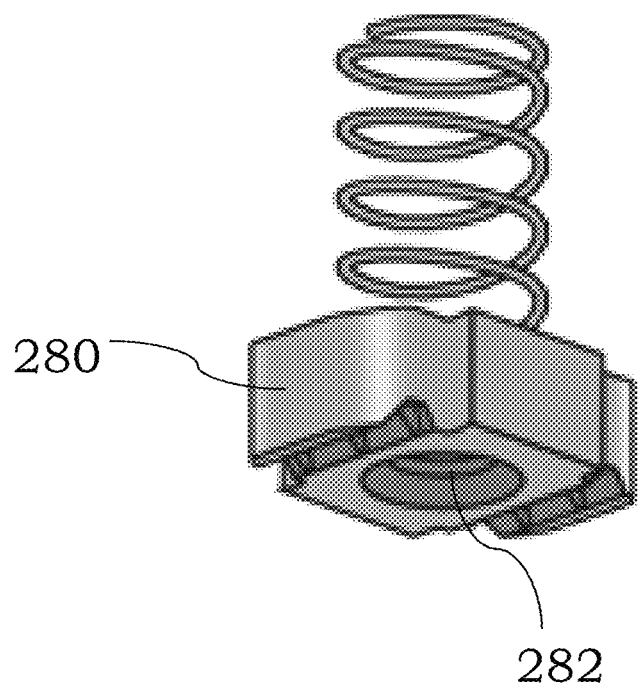
FIG. 2B is an illustration of a channel nut insert, in accordance with some configurations.
Figure 2C:
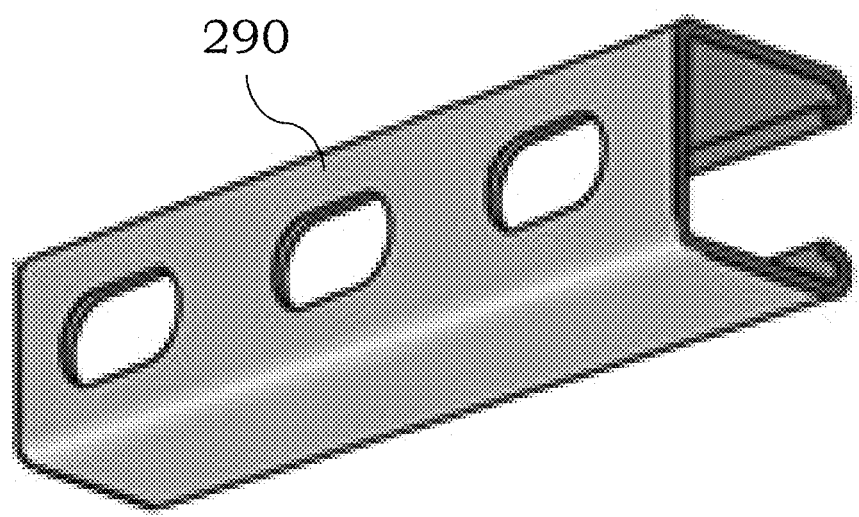
FIG. 2C is an illustration of a channel designed to receive a channel nut insert, in accordance with certain examples.

In some examples, the tools described herein can be used with a Unistrut® insert such as the one shown in FIG. 2B. In this illustration, the insert is configured as a channel nut 280 comprising a spring. The tool can be used by inserting the expandable member 250 into an aperture 282 of the nut 280. The moveable member 220 can then be moved toward the handle 210 to compress the expandable member 250 and promote frictional engagement of the surfaces in the aperture 282 of the nut 280 by the expandable member 250. This engagement permits insertion of the nut 280 into a channel 290 (see FIG. 2C). Once the nut 280 is positioned at a suitable site in the channel 290, the moveable member 220 can be released to permit removal of the tool from the nut 280. A workpiece and/or fastener can then be used with the positioned channel nut 280 to attach the workpiece to the channel section 290.

Figure 3:
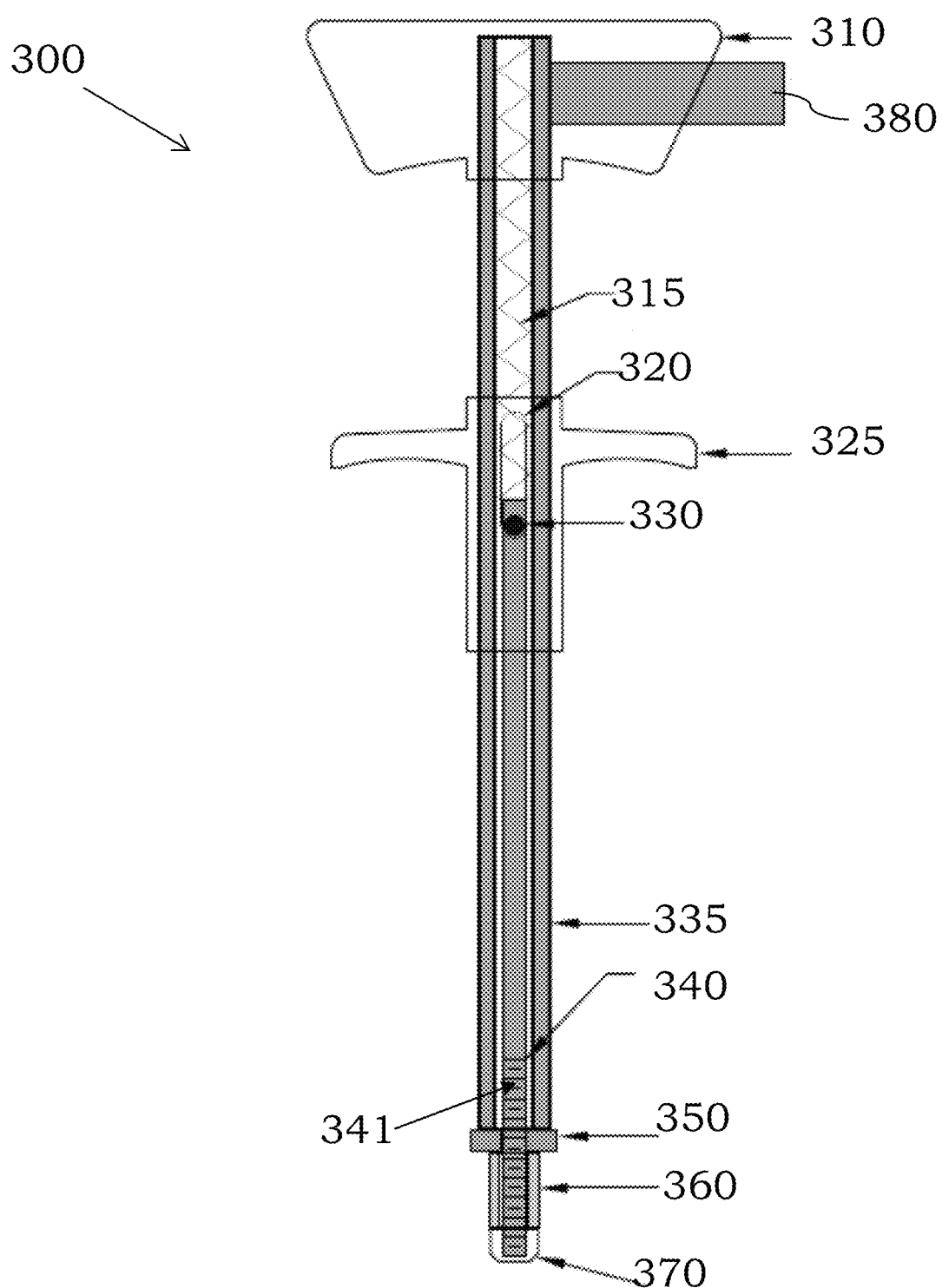
FIG. 3 is another illustration of a grasping tool, in accordance with some examples.

In certain configurations and referring to FIG. 3, another illustration of a tool that can be used with an insert is shown. The tool 300 comprises an optional top handle 310, an internal spring 315, a longitudinal slot 320, a T-handle 325, a pin or dowel 330, an outer tube 335, an internal rod 340 with threads 341, a washer or cap 350, an expandable member 360 and a fastener or end cap 370. The spring 315 is positioned within the tube 335, bears against the dowel or pin 330 and is coupled to the T-handle 325 to provide a resistive force as the T-handle 325 is moved toward the handle 310. The dowel or pin 330 couples the T-handle 325 to the rod 340. The spring 315 can be selected to position the T-handle 325 anywhere along the tube 335. The longitudinal slot 320 permits the T-handle 325 to move upward and/or downward relative to the handle 310. As the T-handle 325 moves toward the handle 310, the spring 315 is compressed and the rod 340 moves toward the handle 310. This movement results in compression of the expandable member 360 to increase its overall width/diameter. The expandable member 360 can grip an insert (not shown) through friction to permit movement of the insert to a desired position. Once the insert is positioned, the T-handle 325 can move back to its resting position to permit the expandable member 360 to return to its non-compressed or initial state and release the insert. The washer or cap 350 prevents movement of the expandable member 360 into the tube 335, and the end cap or fastener 370 prevents the expandable member 360 from decoupling from the rod 340. In addition, movement the threaded fastener 370 toward the handle 310 as the handle 325 is actuated compresses the expandable member 360 between the fastener 370 and the washer 350 to increase its overall width. As noted in more detail below, expandable members of different shapes, sizes and materials can be substituted or used in the tool 300 to permit grasping and movement of a plurality of different types of inserts. An optional attachment point 380 is shown that can be configured to receive a socket, nut driver, screwdriver head, wire stripper or other tools. If desired, the attachment point 380 may comprise an internal magnet to assist in retaining the attachment to the tool 300. The attachment point 380 need not be located proximate to the handle 310 but could instead be positioned anywhere along the tube 335 or at other areas of the tool 300.

Figure 4:
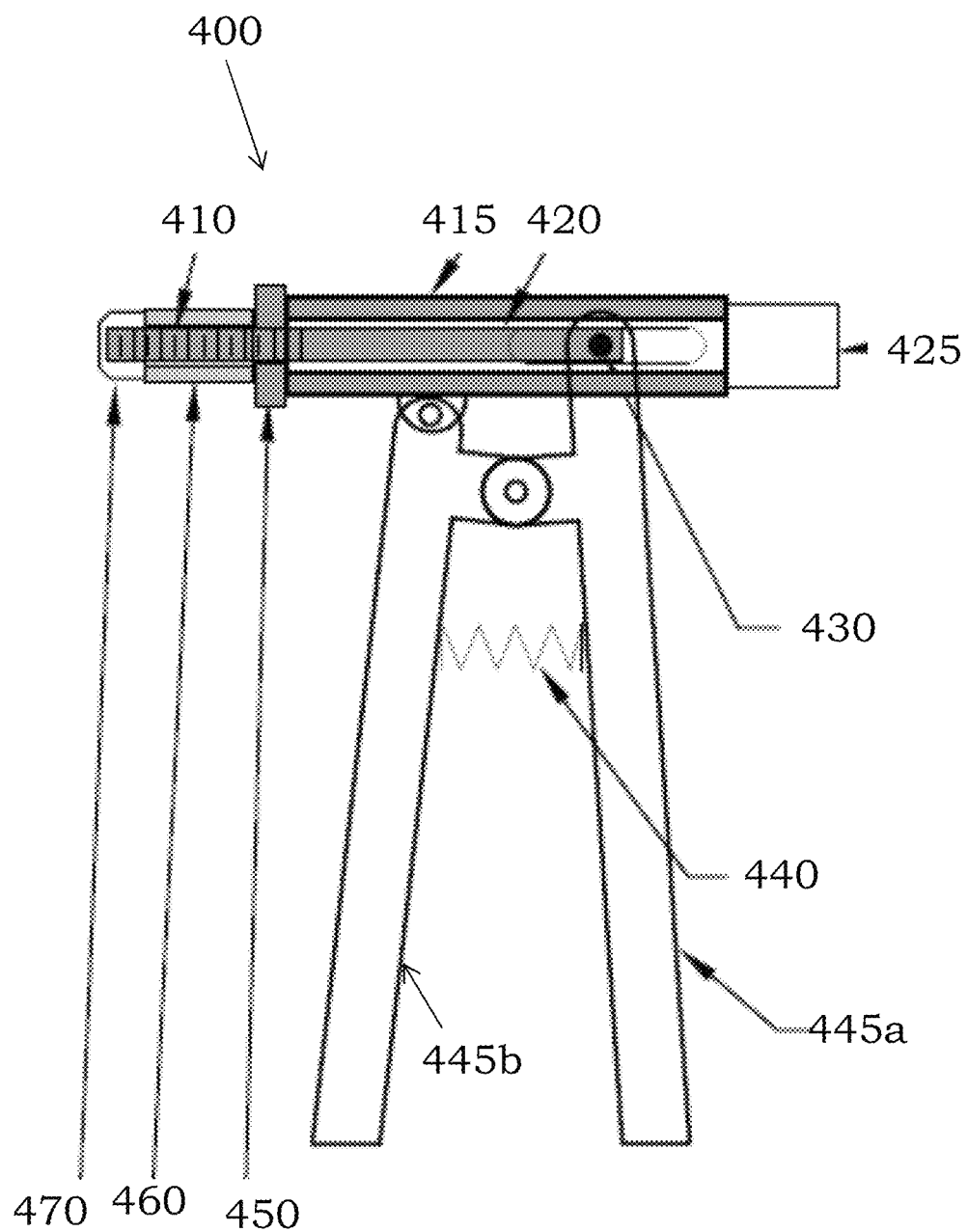
FIG. 4 is another illustration of a grasping tool, in accordance with certain examples.

In certain examples, an additional configuration of a tool is shown in FIG. 4. The tool 400 comprises a rod 410, a tube 415, a longitudinal slot 420 in the tube 415, a dowel or pin 430, a spring 440, handles 445a, 445b, a washer or cap 450, an expandable member 460, and a fastener 470. The dowel or pin 430 couples the rod 410 to the handle 445a. As a user squeezes the handles 445a, 445b together, this movement causes the upper jaws to spread which pulls on the rod 410 within the tube 415. The rod 410 slides within the tube 415 and acts to compress the expandable member 460 between the cap 450 and the cap or fastener 470. In use, the expandable member 460 can be inserted into an aperture of an insert such as a channel nut insert. The handles 445a, 445b can then be squeezed to increase a width of the expandable member 460 and grip the channel insert through friction. The channel insert can then be placed at a desired site, e.g., within a framing channel, and the handles 445a, 445b can be released to permit removal of the tool 400 form the placed channel insert. If desired, a locking feature can be present to hold the handles 445a, 445b in a squeezed position to permit engagement of the insert without continuous application of force to the handles 445a, 445b. An optional attachment point 425 is shown that can be used to couple to a socket, driver, screwdriver head, wire stripper or other tools. If desired, the attachment point 425 may comprise an internal magnet to assist in retaining the attachment to the tool 300. The attachment point 425 need not be located proximate to the handle 445a but could instead be positioned anywhere along the tube 415 or at other areas of the tool 400.

In certain embodiments, the various components of the tools 200, 300, 400 may be produced from many different materials including plastics, metals, wood, elastomers and the like. In some examples, the entire tool can be produced from non-conductive materials to provide an additional safety barrier where the tool is being used in electrical applications. In other examples, the handles of the tools 200, 300, 400 may comprise one or more plastic materials and the tube and rod of the tools 200, 300, 400 may comprise one or more metal materials. Illustrative plastics including thermoplastic materials and thermoset materials including but not limited to polyolefins, acrylics, acrylamides, cellulose acetates, polyvinyl chloride and the like. Where metals are present, the metals may be, for example, stainless steel, aluminum, titanium, magnesium or other suitable materials. While not required, the metal selected for use desirably is rust-resistant and may also be resistant to acids or other corrosive materials. The metal may also be coated with a non-conductive coating to prevent an electrical current from being conducted through the tool to a user.

Figure 5:
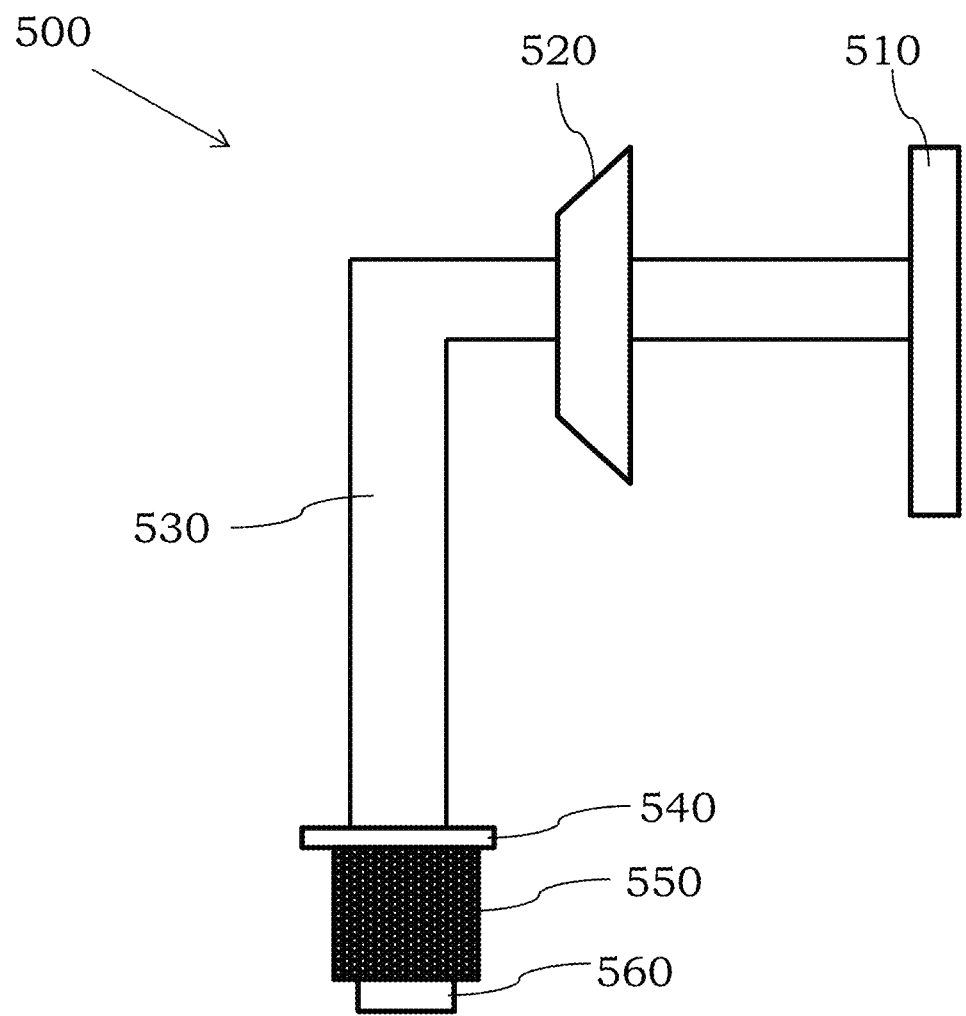
FIG. 5 is another illustration of a grasping tool, in accordance with certain examples.

In certain embodiments, the tube or first longitudinal member of the tools described herein need not be linear to provide a functional tool. For example, it may be desirable to configure the tube with a curve or angle to permit use of the tool in situations where spatial clearance is limited. One illustration of a curved tool is shown in FIG. 5. The tool 500 comprises a fixed handle 510, a moveable handle 520, a tube 530, a cap 540, an expandable member 550 and an end cap 560. If desired, the cap 540 can be omitted and the tube 530 may comprise a flared or expanded portion at its terminus toward the expandable member 550. A flexible internal rod, internal cable or wiring, etc. (not shown) is coupled to the handle 520 and the expandable member 550. An internal spring (not shown) is typically positioned between the handle 510 and the handle 520 to provide a resistive force and position the handle 520 in a relaxed state of the spring. In use of the tool 500, the handle 520 is pressed toward the handle 510 which causes the internal rod, cabling, etc. to move in a direction toward the handle 510. This movement compresses the expandable member 550 between the caps 540, 560 and causes its width to increase. The increase in width of the expandable member 550 permits frictional engagement between the expandable member 550 and an aperture of an insert. While not shown a lock may be present to hold the handle 520 in a second position where the spring between the handles 510, 520 is compressed. This lock may be configured as a mechanical stop that prevents movement of the handle 520 back to its original position and permits the user to release the handle while still maintaining frictional engagement between the tool and the insert. Where the tube 530 is non-linear, the rod within the tube may be flexible, at least to some degree, to permit movement of the rod in a non-linear manner when the handle 520 is depressed. For example, the internal rod may comprise an elastomer or flexible plastic material to permit it to bend around the tube 530 without breaking or undue stress.

Figure 6:
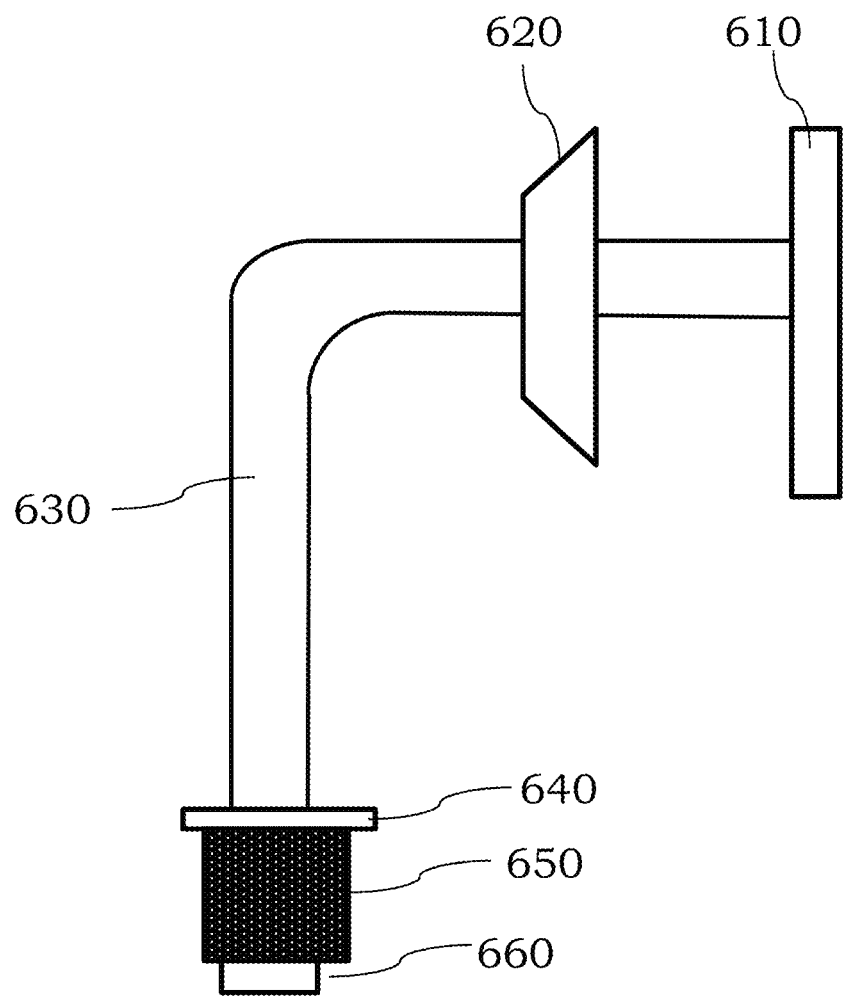
FIG. 6 is another illustration of a grasping tool, in accordance with certain examples.

In other instances, the tube itself may be curved gradually to assist in movement of the internal rod or cabling. Referring to FIG. 6, a tool 600 comprise a fixed handle 610, a moveable handle 620, a tube 630, a cap 640, an expandable member 650 and an end cap 660. If desired, the cap 640 can be omitted and the tube 630 may comprise a flared or expanded portion at its terminus toward the expandable member 650. A flexible internal rod, internal cable or wiring, etc. (not shown) is coupled to the handle 620 and the expandable member 650. An internal spring (not shown) is typically positioned between the handle 610 and the handle 620 to provide a resistive force and position the handle 620 in a relaxed state of the spring. In use of the tool 600, the handle 620 is pressed toward the handle 610 which causes the internal rod, cabling, etc. to move in a direction toward the handle 610. This movement compresses the expandable member 650 between the caps 640, 660 and causes its width to increase. The increase in width of the expandable member 650 permits frictional engagement between the expandable member 650 and an aperture of an insert. While not shown, a lock may be present to hold the handle 620 in a second position where the spring between the handles 610, 620 is compressed. This lock may be configured as a mechanical stop which prevents movement of the handle 620 back to its original position and permits the user to release the handle 620 while still maintaining frictional engagement between the tool 600 and the insert. Where the tube 630 is non-linear, the rod within the tube may be flexible, at least to some degree, to permit movement of the rod in a non-linear manner when the handle 620 is depressed. For example, the internal rod may comprise an elastomer or flexible plastic material to permit it to bend around the tube 630 without breaking.

Figure 7:
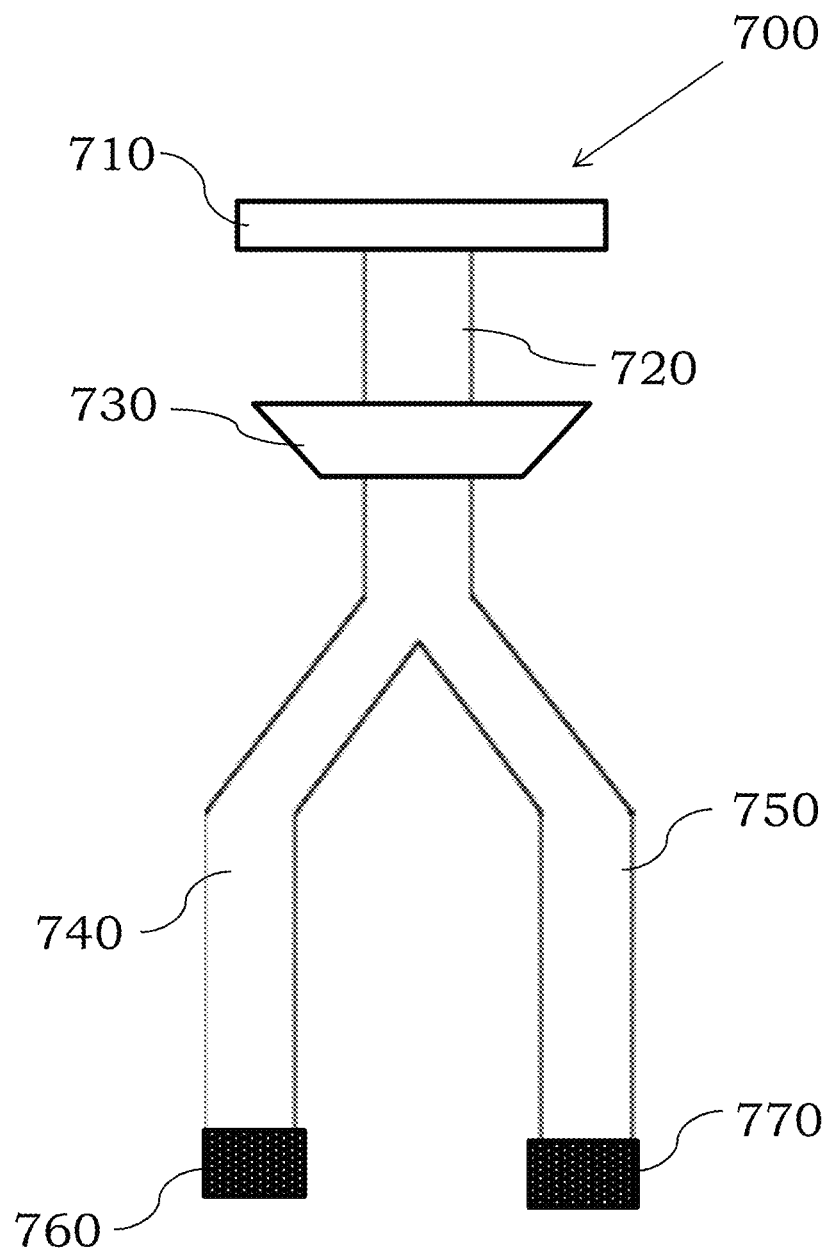
FIG. 7 is an illustration of a two headed grasping tool, in accordance with certain examples.

In some embodiments, the tools described herein may be configured with more than one expandable member. Referring to FIG. 7, a tool comprising two expandable members is shown. The lateral spacing between expandable members can be selected, for example, based on a desired insert spacing within the channel configured to receive two or more inserts. By using the two headed tool, the insert spacing can be correct, e.g., follow electrical code or building codes, without the need to independently position each of the inserts. The tool 700 comprises an end or handle 710, a handle or moveable member 730, and an outer tube 720 that splits into legs 740, 750 each of which comprises an expandable member 760, 770, respectively. While not shown, an internal rod, cabling or other means couples the expandable members 760, 770 to the handle 730. Movement of the handle 730 toward the end or handle 710 acts to compress each of the expandable members 760, 770 and increase their outer diameter. Inserts engaged by the compressed expandable members 760, 770 can be moved to a desired position within a channel, and then the handle 730 can be released to permit removal of the tool 700 from the inserts while maintaining a desired spacing between the two inserts.

The tools described herein can be used to position many different sizes and types of inserts within a channel. For example, the tools can be used to grasp channel nuts with or without springs. The tool can be used to engage channel nuts designed to be inserted into fiberglass or metal framing of various sizes including 1⅝" framing, 1¼" framing, ¹³⁄₁₆" framing or framing having other sizes. The tool can be used to insert channel nuts into slotted and non-slotted channels. The tool may comprise a wrench or be configured to receive a wrench to permit its use with infinite and incremental telescoping struts. The attachment site of the tool may comprise a magnet, threads or other means to assist in retaining the wrench or other inserted tools in the grasping tool.

Figure 8:
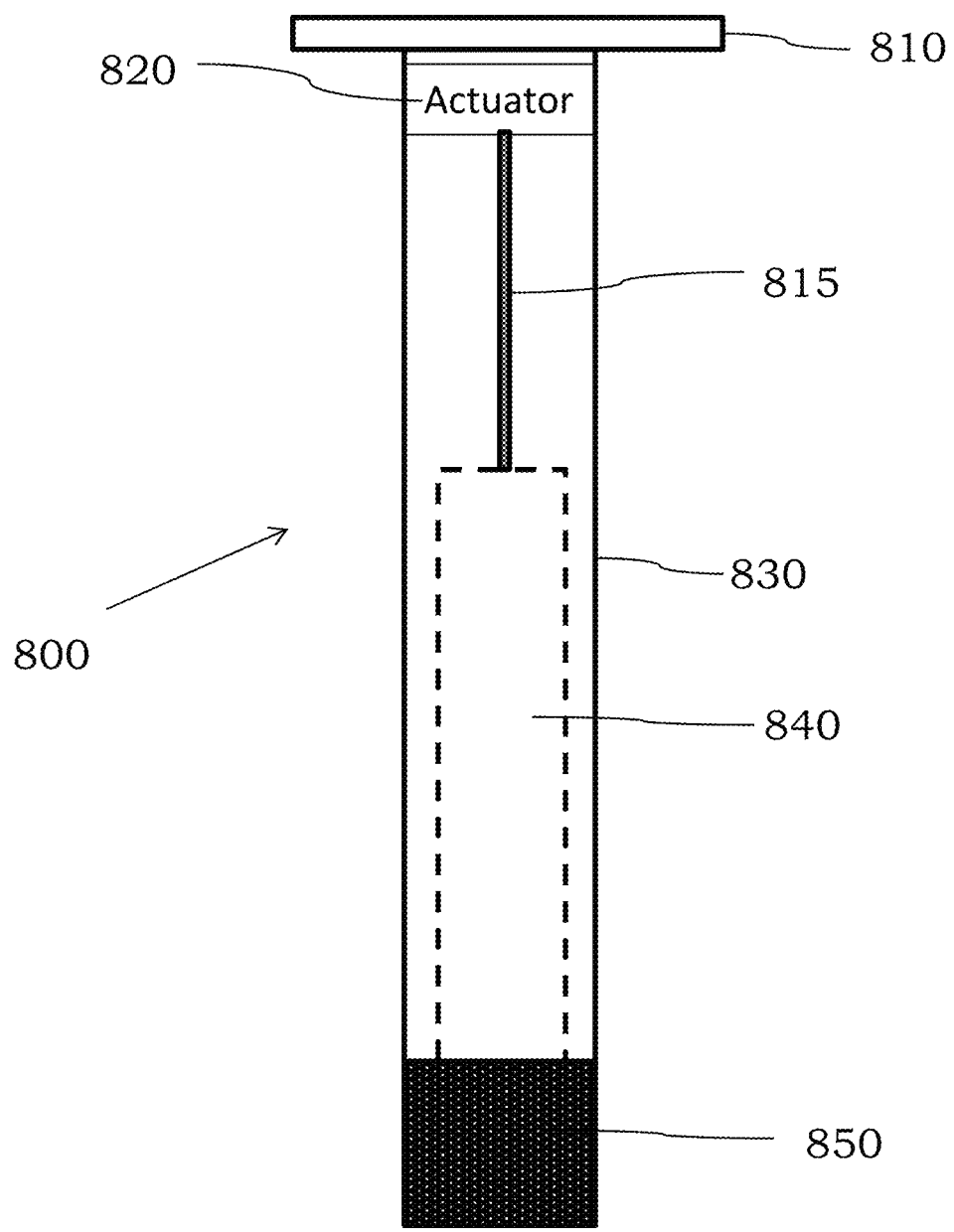
FIG. 8 is an illustration of a tool comprising an actuator, in accordance with certain examples.

In some examples, a tool as described herein can be used with a pneumatic source or a motor to cause movement of the internal rod. A simplified diagram is shown in FIG. 8, where a tool 800 comprises a handle 810, an actuator 820, e.g., a stepper motor, coupled to an internal rod 840 at a first end through a connecting rod 815. The internal rod 840 and motor 820 can be positioned within an outer tube 830. The internal rod 840 can be coupled to an expandable member 850 at a second end of the internal rod 840. Depression of a button in the handle 810 can act to cause the rod 840 to move toward the handle 810 and increase an overall diameter of the expandable member 850. Release of the button can act to cause the rod 840 to move back to an initial position, or, a switch on the handle 810 or outer tube 830 can be actuated to cause the actuator 820 to move the connecting rod 815 in an opposite direction. The actuator 820 can be electrically coupled to an on-board power source such as a battery, fuel cell or other means. If desired, the actuator 820 can be replaced or used with an air source or pneumatic cylinder that is designed to force the connecting rod downward. For example, an initial position of the rod 840, in the absence of any air pressure, may be designed to cause compression of the expandable member 850, e.g., a spring can be present to bias the rod 830 toward the handle 810 in an initial position. Application of pneumatic pressure can force the rod 840 downward to stretch out the expandable member 850 and permit insertion into an aperture of an insert. Removal of the air pressure causes the rod 840 to return to its initial state and compress the member 850, which permits frictional engagement of the insert by the tool 800. Once the insert is positioned at a desired site in a channel, pneumatic pressure can then be applied to permit the tool 800 to release the insert. If desired, hydraulic pressure could be used in place of, or in addition to, pneumatic pressure to assist in grasping and release of inserts using the tools described herein.

Figure 9:
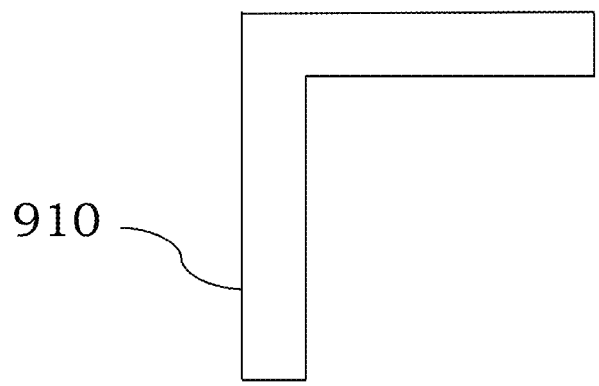
FIG. 9 is an illustration of an L-shaped handle, in accordance with some examples.

In certain embodiments, the various handles described herein may be configured as T-shapes handles, L-shaped handles or may take other shapes. FIG. 9 shows an illustration of an L-shaped handle 910 which can be used to couple to an internal rod, cabling or other means. Circular disk shaped handles, square shaped handles or other handles may also be used. The handles may comprise grip features configured to receive the fingers of a user and may also comprise rubber or other means to provide a soft grip to reduce fatigue.

In some configurations, the expandable members described herein may take the form of a cylindrical sleeve. The cylindrical sleeve may have many different lengths and/or widths, and in some instances, a kit comprising a tool and a plurality of differently sized expandable members may be present. If desired, the expandable member can be part of a head which comprises two or more caps. The head can be coupled to an internal rod, cabling or other internal means coupled to a handle to provide a compressive force on the expandable member when it is coupled to the internal rod, cabling or other means. While the expandable members are described as being generally circular in nature, other cross-sectional shapes such as rectangular, pyramidal, triangular, elliptical, etc. could be present instead. The expandable material may comprise an elastomer such as natural rubber, synthetic rubber or polymeric materials and may have a coefficient of friction high enough to prevent slipping or sliding of the insert when the expandable member is in its compressed state.

In some examples, the expandable member may comprise a magnet or other means to assist in retention of the tool to the insert (at least to some degree) even when the handle is not compressed. For example, a magnet can be present under the expandable member to act to retain the tool to the insert even when the handle is not actuated and the expandable member is not compressed. The presence of a magnet may be particularly useful where the inserts are being positioned in overhead framing channels along the ceilings of tall structures. The magnet can act to retain the tool to the channel or insert and reduce the likelihood of a user dropping the tool.

If desired, the tool can also be used to position slotted framing channeling itself to permit attachment of the channeling to a wall, ceiling or other structure. This process can be performed by engaging a slot or opening on the channel using the grasping tools described herein to position the channel at a desired site.

When introducing elements of the aspects, embodiments and examples disclosed herein, the articles "a," "an," "the" and "said" are intended to mean that there are one or more of the elements. The terms "comprising," "including" and "having" are intended to be open-ended and mean that there may be additional elements other than the listed elements. It will be recognized by the person of ordinary skill in the art, given the benefit of this disclosure, that various components of the examples can be interchanged or substituted with various components in other examples.

Although certain aspects, examples and embodiments have been described above, it will be recognized by the person of ordinary skill in the art, given the benefit of this disclosure, that additions, substitutions, modifications, and alterations of the disclosed illustrative aspects, examples and embodiments are possible.

What is claimed is:

1. A grasping and positioning tool comprising:
   a handle configured to receive a socket or a driver;
   a moveable member configured as a T-shaped handle or an L-shaped handle;
   a first longitudinal member comprising a first end and a second end opposite the first end, the first longitudinal member coupled to the handle at the first end of the first longitudinal member and configured to receive the moveable member to permit longitudinal movement of the moveable member along a longitudinal dimension of the first longitudinal member;
   a second longitudinal member comprising a first end and a second end, the second longitudinal member inserted into the first longitudinal member, the second longitudinal member coupled to the moveable member at the first end of the second longitudinal member so that adjustment of a position of the moveable member moves the second longitudinal member longitudinally within the first longitudinal member, wherein the moveable member is coupled to the second longitudinal member through an internal fastener, and wherein the second longitudinal member comprises threads at the second end to couple the second longitudinal member to an expandable member;

the expandable member coupled to the second end of the second longitudinal member, the expandable member configured to increase its outer diameter as the moveable member is moved toward the handle coupled to the first longitudinal member;

a spring positioned within the first longitudinal member and positioned between the first end of the first longitudinal member and the first end of the second longitudinal member, the spring configured to bias the second longitudinal member, away from the handle in a non-compressed state of the spring;

an external fastener positioned at the second end of the first longitudinal member, wherein the external fastener comprises an inner diameter smaller than an inner diameter of the first longitudinal member; and an additional external fastener coupled to the threads at the second end of the second longitudinal member, wherein the additional external fastener is configured to retain the expandable member between the external fastener and the additional external fastener.

2. The grasping and positioning tool of claim 1, wherein the expandable member comprises an elastic material with a high coefficient of friction.

3. The grasping and positioning tool of claim 1, wherein the handle comprises non-electrically conductive materials.

4. The grasping and positioning tool of claim 1, wherein the first longitudinal member comprises non-electrically conductive materials.

5. The grasping and positioning tool of claim 1, wherein the second longitudinal member comprises non-electrically conductive materials.

6. The grasping and positioning tool of claim 1, wherein the moveable member comprises non-electrically conductive materials.

7. The grasping and positioning tool of claim 1, wherein the expandable member comprises non-electrically conductive materials.

* * * * *